US006951101B2

(12) United States Patent
Nitsche et al.

(10) Patent No.: US 6,951,101 B2
(45) Date of Patent: Oct. 4, 2005

(54) METHOD AND DEVICE FOR CONTROLLING A HYDRODYNAMIC CLUTCH

(75) Inventors: Martin Nitsche, Gerstetten (DE); Martin Becke, Ulm (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 45 days.

(21) Appl. No.: 10/363,526

(22) PCT Filed: Sep. 4, 2001

(86) PCT No.: PCT/EP01/10136

§ 371 (c)(1),
(2), (4) Date: Apr. 11, 2003

(87) PCT Pub. No.: WO02/25129

PCT Pub. Date: Mar. 28, 2002

(65) Prior Publication Data

US 2003/0167761 A1 Sep. 11, 2003

(30) Foreign Application Priority Data

Sep. 4, 2000 (DE) .......................................... 100 43 713

(51) Int. Cl.[7] .............................................. F16D 33/16
(52) U.S. Cl. .............................. 60/329; 60/337; 60/339
(58) Field of Search ........................... 60/329, 337, 339

(56) References Cited

U.S. PATENT DOCUMENTS

| 4,191,072 A | | 3/1980 | Ehrlinger et al. ............. 74/732 |
|---|---|---|---|
| 4,440,272 A | * | 4/1984 | Bieber .......................... 60/337 |
| 4,926,988 A | * | 5/1990 | Kundermann ............... 192/3.3 |
| 5,058,716 A | * | 10/1991 | Lippe et al. ............... 192/3.33 |
| 5,762,134 A | * | 6/1998 | Droste et al. ................. 60/337 |
| 5,946,984 A | | 9/1999 | Nitsche et al. ............. 74/733.1 |

FOREIGN PATENT DOCUMENTS

| DE | 2 150 115 | 4/1973 |
|---|---|---|
| DE | 34 30 456 | 10/1985 |
| WO | WO 98/25053 | 6/1998 |
| WO | WO 98/25054 | 6/1998 |
| WO | WO 00/53478 | 9/2000 |

\* cited by examiner

*Primary Examiner*—Thomas E. Lazo
(74) *Attorney, Agent, or Firm*—Baker & Daniels

(57) ABSTRACT

A method for controlling and filling a hydrodynamic clutch. A set variable can be preset for a variable which at least indirectly characterizes the functional state of the hydrodynamic clutch and which serves as an input variable of a control device assigned to the lubricant or operating material supply system. The control device comprises a pressure balance for controlling an adjusting device for influencing the operating material supply of the hydrodynamic clutch. The set variable can be preset in order to enable the adjustment of at least three basic functional states of the hydrodynamic clutch.

22 Claims, 14 Drawing Sheets

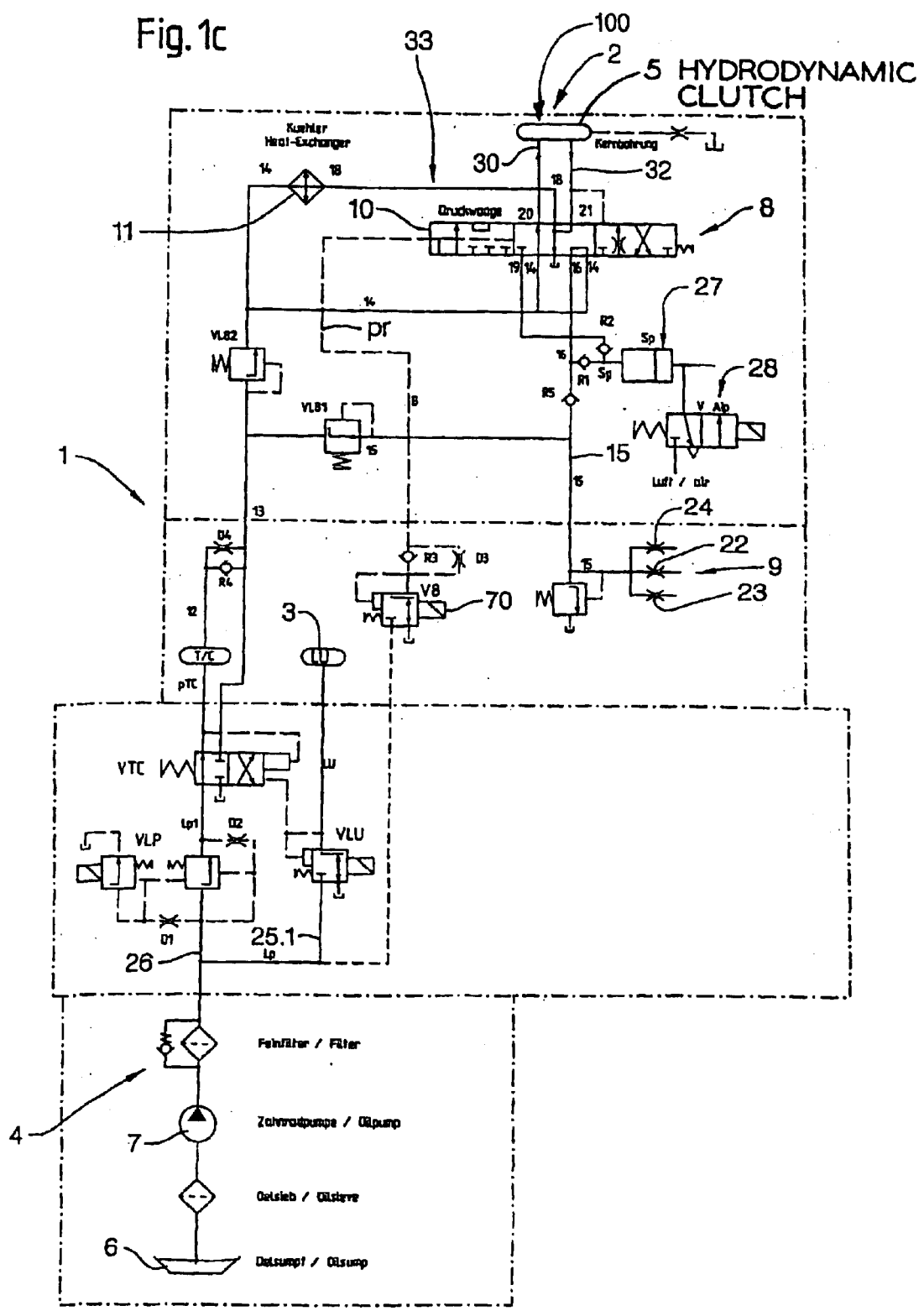

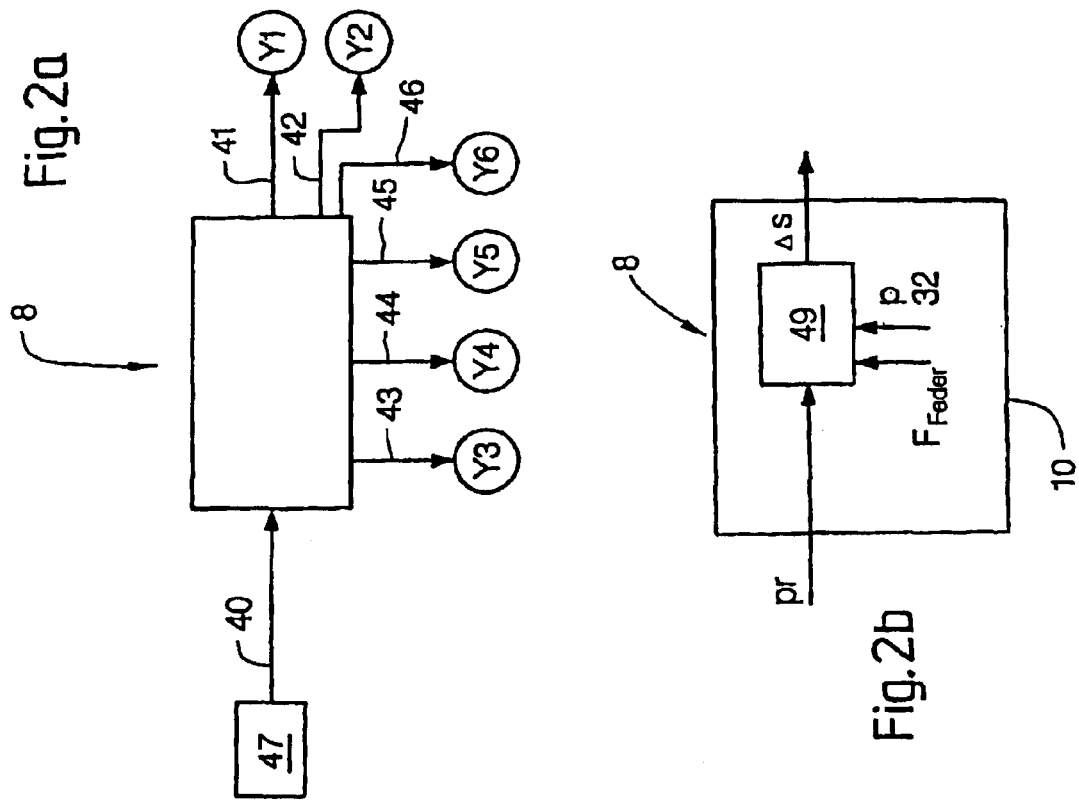

Y1 = coupling supply hydrodynamic element / operating material source

Y2 = coupling supply hydrodynamic element / reservoir

Y3 = coupling discharge hydrodynamic element / cooling device

Y4 = coupling operating material source/ lubricant system

Y5 = coupling supply hydrodynamic element/ cooling device

Y6 = hydrodynamic element in the bypass during operating material or lubricant circulation

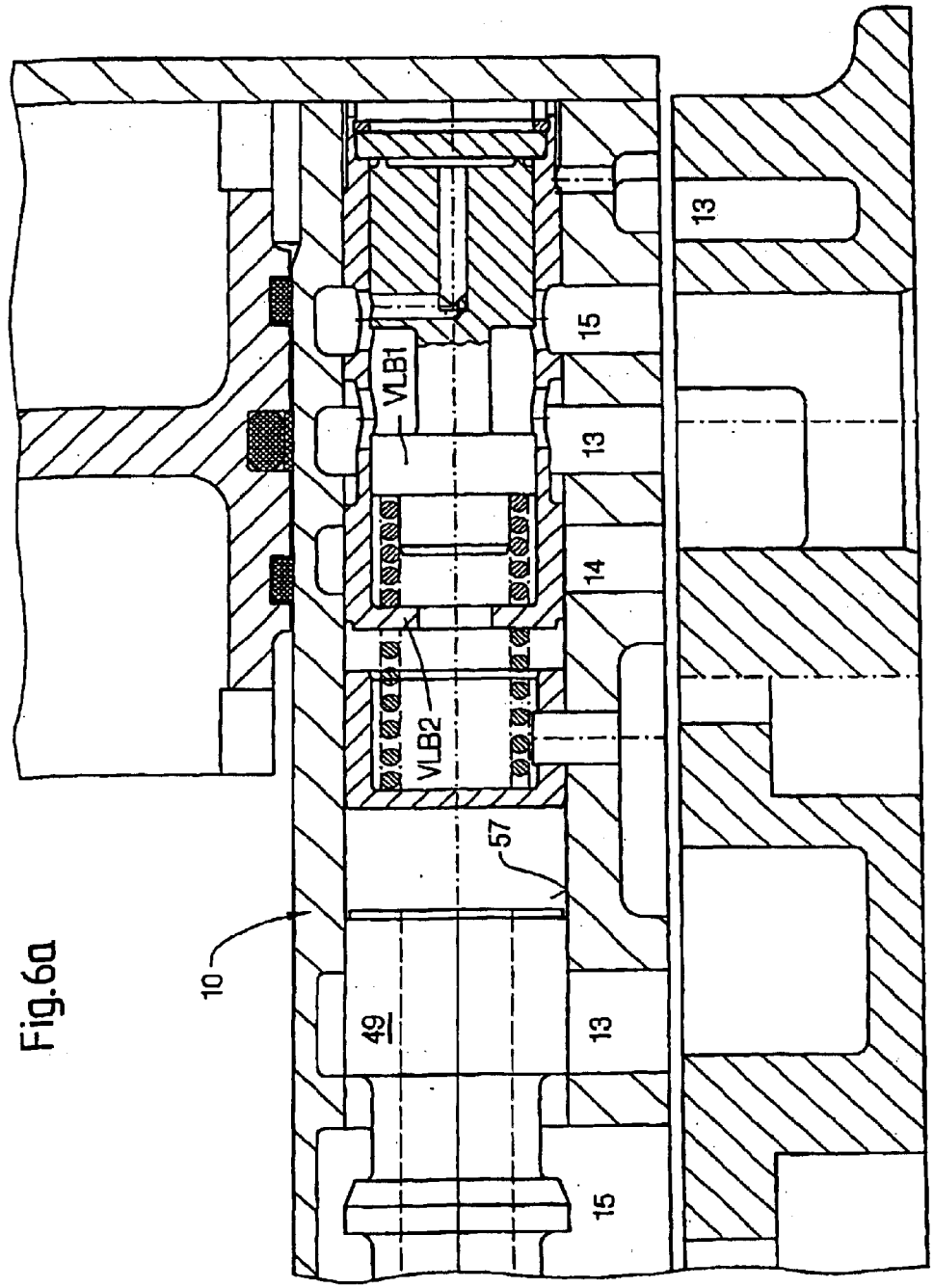

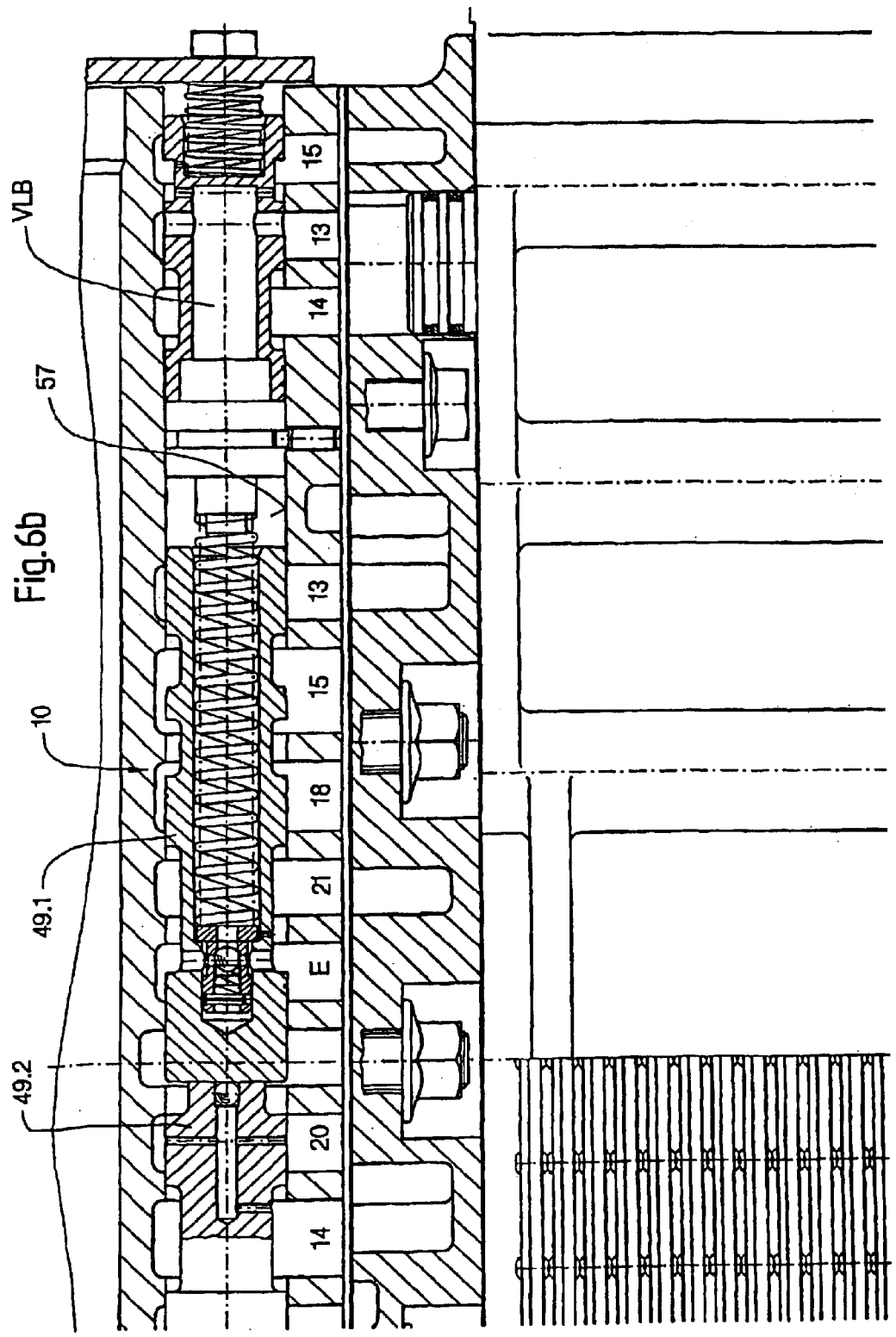

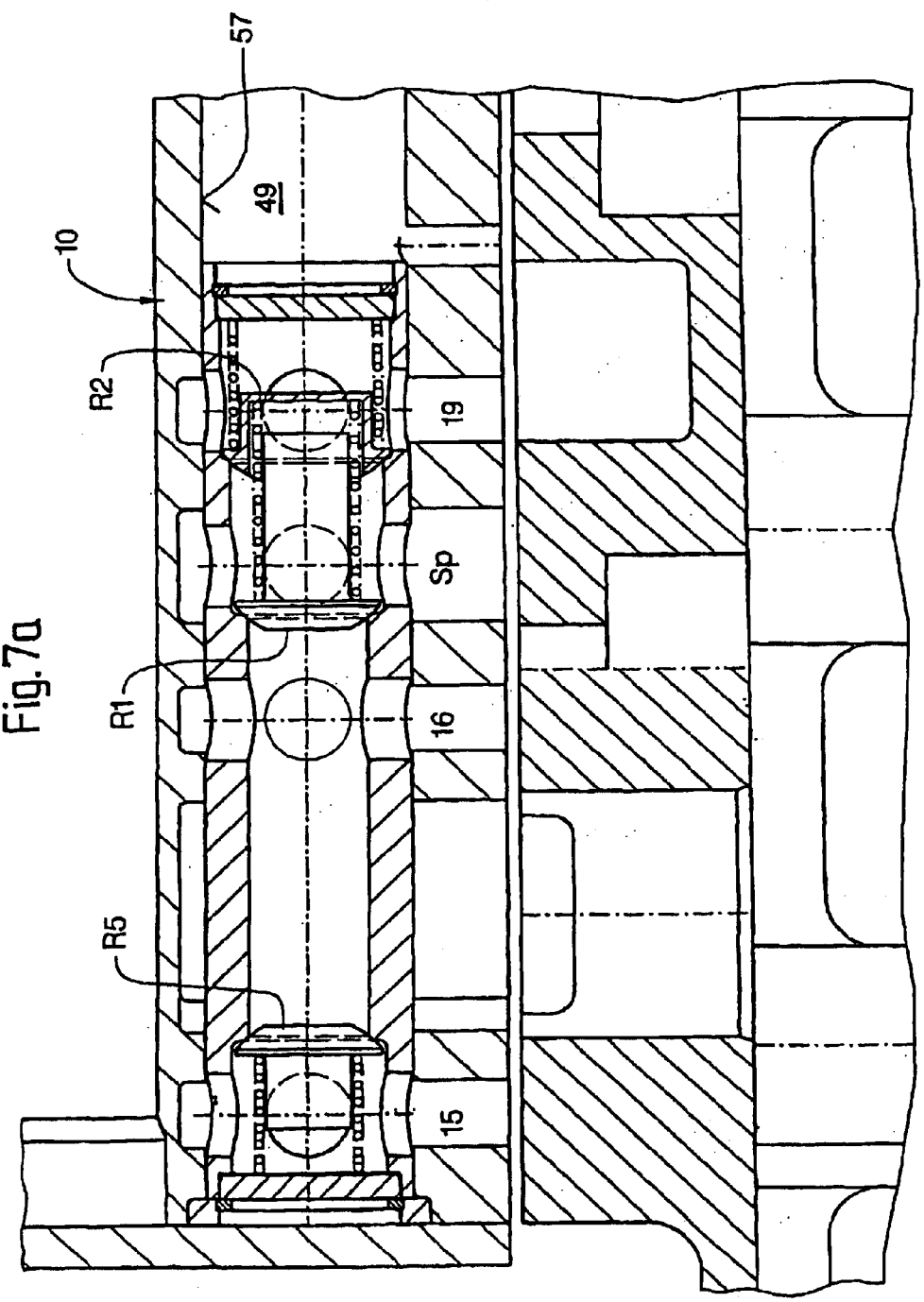

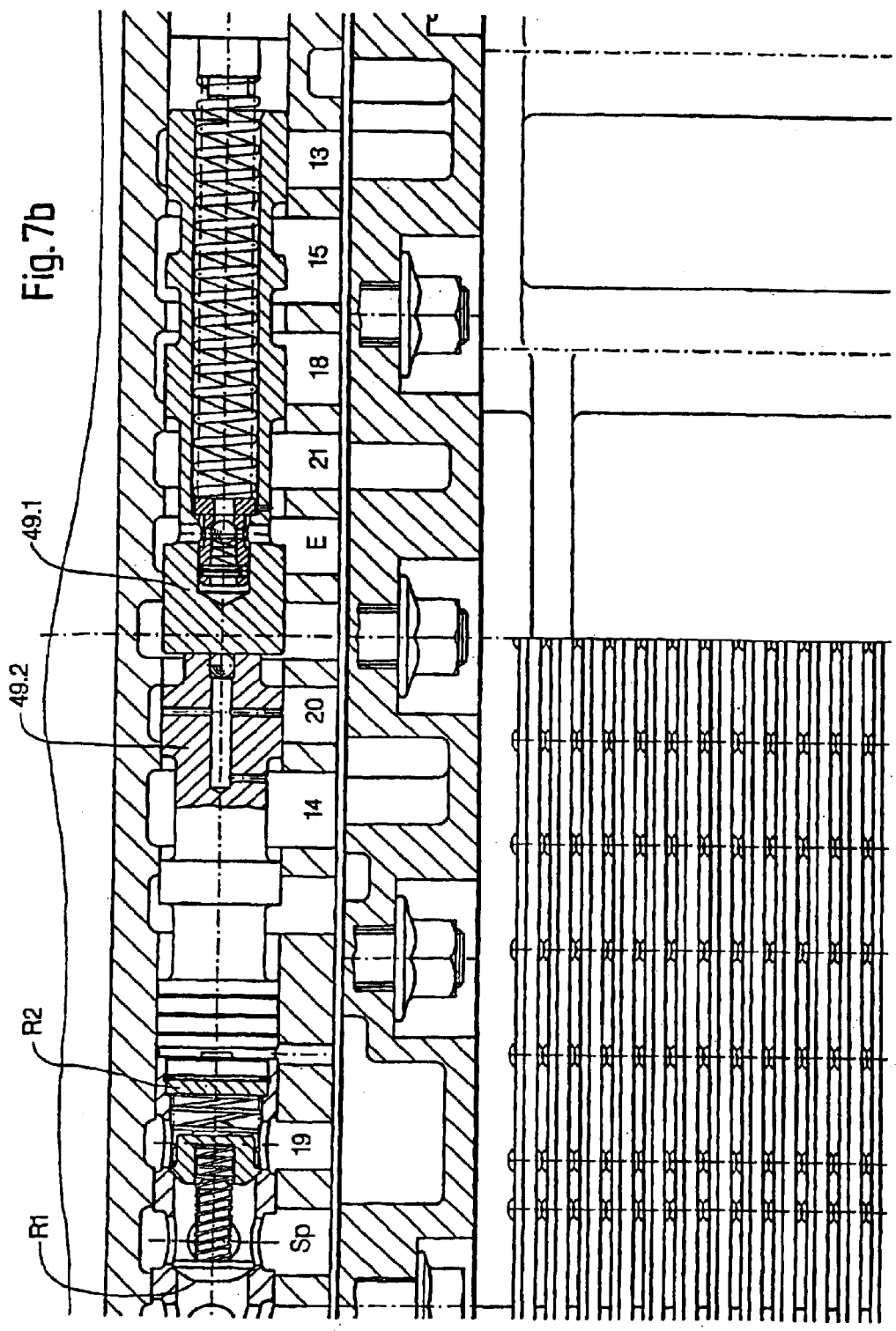

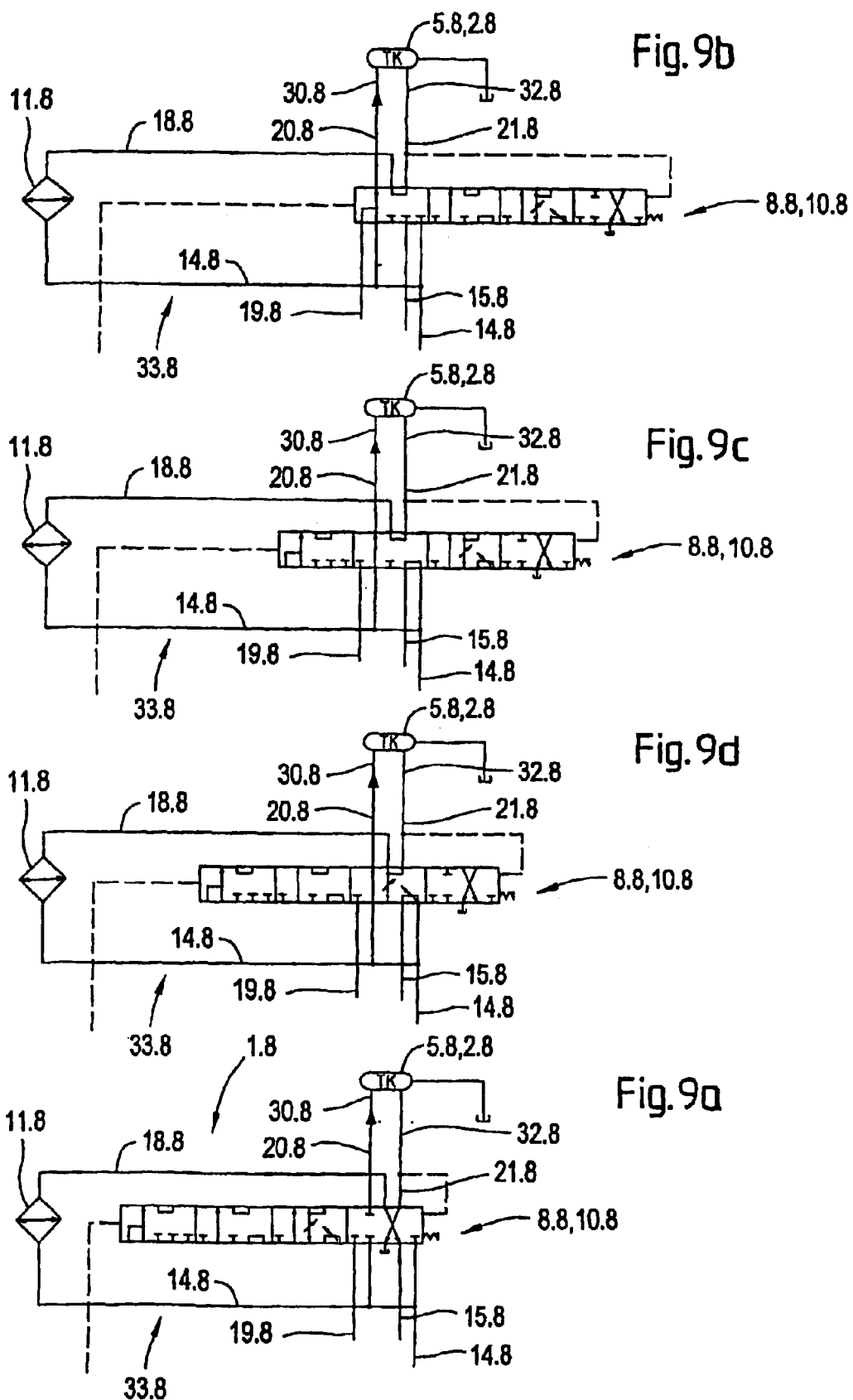

METHOD AND DEVICE FOR CONTROLLING A HYDRODYNAMIC CLUTCH

BACKGROUND OF THE INVENTION

The invention relates to a method for controlling a hydrodynamic clutch in a drive unit, an associated lubrication and operating material supply system, comprising an operating material source, a cooling device and a storage device.

Hydrodynamic clutches are known for many different applications. Among others, such hydrodynamic units are used as hydrodynamic clutches and hydrodynamic brakes. With regard to the constructive design options of hydrodynamic machines as hydrodynamic clutches or brakes, reference is made to "Voith: Hydrodynamic Gears, Clutches, Brakes. Otto Krausskopf Verlag GmbH, Mainz, 1970". The disclosure content of said publication in this connection is hereby fully incorporated into the disclosure content of the present application.

Hydrodynamic clutches are known for example from the "VDI [Association of German Engineers] Handbook of Gear Technology II", VDI Guidelines VDI 2153, Hydrodynamic Power Transfer Definitions—Designs—Methods of Operation, whose disclosure content with regard to the design of such units is hereby fully incorporated into the present application. Clutches, especially when used in motor vehicles or in systems with highly fluctuating operation, are engaged or disengaged by means of filling the working cycle with an operating fluid and by draining the bladed working cycle. In drive trains, a commonly useable lubricant and operating material supply system is generally assigned to a plurality of components. For optimally meeting the requirements of the individual elements in the drive system, control devices are usually assigned to the individual elements so as to ensure the respective operating material and lubricant supply. The technical control and regulation are very complex.

Therefore, the objective of the invention is to develop a method for controlling a hydrodynamic clutch and also a device for controlling a hydrodynamic clutch such that with a minor effort for construction and technical control a secure and reliable method of operation is always ensured for the individual components, especially the hydrodynamic clutch. The individual possible functions should be easily adjustable.

The inventive solution to the problem is characterized by the features described hereinafter.

SUMMARY OF THE INVENTION

According to the invention, in a drive system with at least one hydrodynamic clutch comprising at least two blade wheels that together form a toroidal working space to which at least one supply line and one discharge line are assigned and to which a lubricant or operating material supply system is assigned, a set variable can be preset for a variable characterizing at least indirectly the functional state of the hydrodynamic clutch and which serves as an input variable of the control device assigned to the lubricant or operating material supply system for controlling an adjustment device for influencing the operating material supply of the hydrodynamic clutch such that at least three basic functional states of the hydrodynamic clutch can be set. Said states are draining, filling and, depending on the type of the hydrodynamic element, controlling the transferable moment.

At least three basic functional states can be set for the hydrodynamic clutch via the adjustment device for influencing the operating material supply of the hydrodynamic clutch, where in a first basic functional state the hydrodynamic clutch is disengaged, especially drained, while in a second basic functional state the working space of the hydrodynamic clutch is supplied with operating material via an operating material source and in a closed circuit a portion of the operating material from the working space is resupplied to the working space via a cooling device, and in a third basic functional state, also called controlled state, a portion of the operating material from the working space is resupplied to the working space via the cooling device and the leakage is compensated by means of a coupling to the operating material supply source, where in said state the transferable moment can be varied in that the fill factor is changed.

According to an especially advantageous embodiment, the method of the invention is used for a hydrodynamic element in the form of a hydrodynamic clutch in a drive unit with an associated bridging clutch. The drive unit comprises a supply system for lubricant and/or operating material and/or control means and an optional storage device which is used both by a hydrodynamic clutch and a bridging clutch. In one basic functional state, the supply of the lubricant system of the drive system is additionally adjustable, where the set variable for actuating the adjustment device is generated from the set value of the variable characterizing at least indirectly the functional state of the hydrodynamic clutch in dependence of a variable characterizing at least indirectly the pressure in the discharge line of the hydrodynamic clutch.

By means of the adjustment device for influencing the operating material supply of the hydrodynamic clutch at least the three basic functional states of the hydrodynamic clutch listed below are adjustable, where a) in a first basic functional state of the hydrodynamic clutch, especially the draining or the drained element, operating material from an operating supply source is supplied to the lubricant connection of the drive unit via the cooling device;

b) in a second basic functional state the working space of the hydrodynamic clutch is supplied with operating material from a reservoir and from the operating material source and in a closed circuit a portion of the operating material from the working space is resupplied to the working space via the cooling device, and c) in a third basic functional state, also called controlled state, a portion of the operating material from the working space is resupplied to the working space via the cooling device, and leakage is compensated by means of a coupling with the operating material supply source.

In the third basic functional state, at least two boundary states are advantageously differentiated, a first boundary state for high operating pressures and a second boundary state for low pressures. The pressure in the available control range is changed either stepwise or continuously.

In terms of technical equipment, the terms "supply line" and "discharge line" should not necessarily be understood to be lines. They can also be present in the form of channels or another type of mechanism guiding the operating material.

In the simplest case, the adjustment between the individual basic functional states takes place in a plurality of steps, but advantageously also continuously.

The term lubricant supply systems combines the devices used to lubricate individual components of the drive unit, for example the bearings.

The supply of the control means which may be provided relates to providing the required operating forces for the bridging clutch by means of hydraulics.

The method of the invention allows that an operating material or lubricant supply system which is used in common by the hydrodynamic clutch and the complete drive unit always ensures a safe and reliable method of operation for the individual components, especially the hydrodynamic clutch, with only a minor effort for the design and especially for technical control, because a variable characterizing at least indirectly the pressure in the discharge line of the hydrodynamic clutch, advantageously the pressure itself, is always taken into consideration.

According to a refinement of the method of the invention, additional steps are taken so as to ensure a reliable method of operation of the complete drive system. For example, additional valve devices are provided for performing separate partial functions with priority or with a certain valence, including, for example, a) giving priority to providing the primary pressure of the hydrodynamic clutch;
b) permanent lubricant supply for the drive unit, for example depending on the pressure or by means of volume control.

Advantageously, the hydrodynamic unit is a hydrodynamic clutch comprising a pump wheel and a turbine wheel. An application in connection with hydrodynamic converters is also conceivable. Another application is a hydrodynamic clutch with which optionally the function of generating a braking moment and transferring high torques can be achieved, as described in PCT/EP97/06623 and PCT/EP97/06646, for example. The disclosure content of said patents with regard to constructive design, method of operation and control of a hydrodynamic clutch operated in such a way is hereby fully incorporated into the disclosure content of the present application.

The hydrodynamic clutch comprises at least two blade wheels that together form a toroidal working space. Theoretically, it is also possible to use the method of the invention for hydrodynamic units that have multiple working spaces, for example duplex clutches.

In terms of equipment, such functions are handled by means of a control device which is assigned to a lubricant and operating material supply system of the hydrodynamic clutch. When the hydrodynamic clutch is used in a drive unit, the control device is advantageously assigned to the lubricant or operating material supply system used in common by the hydrodynamic element and the bridging clutch.

Using one single or commonly useable control device offers the advantage of a central arrangement for supplying multiple systems. It advantageously comprises a pressure balance, i.e. the functional principle is based on compensating the force of pressure acting on a plunger of known cross-sectional area or the sealing liquid in a ring pipe by means of a counter-force, where a balance of forces is achieved in that the plunger is moved, for example. The force of pressure and the counter-force are a force of pressure corresponding to the preset value for a desired functional state of the hydrodynamic clutch, which can be described by the size of the area of application in the pressure balance and a pressure generated by means of a proportional valve, for example, and a force characterized by the pressure in the discharge line of the hydrodynamic clutch and the associated area of application in the pressure balance.

The control device has a housing in which at least one control boring is worked in. As viewed over its axial extension, the control boring advantageously has varying diameters forming separate control chambers that can be coupled to connections. However, designs with angular chambers are also conceivable. In the control boring, at least one control plunger is disposed which can be moved in an axial direction and which advantageously also has varying diameters over its axial extension. The individual partial sections with varying diameter, or with varying dimensions in the case of an angular design, on the control plunger and the control boring form the so-called control edges.

The areas with varying outside diameter or varying outside dimensions of the control plunger can be disposed so as to alternate. The control plunger is advantageously designed such that as viewed over its axial length, it has only two different diameters, a first diameter which is smaller than the diameter of the control boring, and a second diameter, which substantially corresponds to the diameter of the control boring taking into account the required tolerances. In accordance with the position of the control plunger, especially the control edges in the control boring, the individual connections are at least partially or fully uncovered or covered as a result of which the individual functional states of the hydrodynamic clutch are achieved, and when used in driving units, the function of supplying the lubricant system of the drive unit is possibly achieved in addition. At least the following individual connections should be provided:

Connection 1—operating material supply source and cooling device
Connection 2—reservoir
Connection 3—supply line of the hydrodynamic clutch
Connection 4—discharge line of the hydrodynamic clutch
Connection 5—cooling device
Connection 6—lubricant line for the drive unit The embodiment used for drive units is described below.

The input variable is a set variable for a variable characterizing at least indirectly the functional state of the hydrodynamic clutch. It can be preset in the form of a signal for putting into operation the element embodied by the hydrodynamic clutch, for example, from which a set variable is formed for actuating an adjustment device for influencing the operating material supply of the hydrodynamic clutch. When the control device is embodied by a pressure balance the control plunger acts as an adjustment device. The set variable is the force acting on the control plunger. The other input variable is formed by the pressure in the discharge line of the hydrodynamic clutch or by the pressure on an outlet from the working space.

The pressure balance represents a simple, cost-effective and compact control device. In order to provide a universal unit, additional valve devices for a variety of different functions are advantageously integrated in the control device, for example for the volume control of the lubricant supply regardless of the pressures that are present in the system. The valve devices are advantageously combined into units that can be disposed in the control boring of the pressure balance, which provides an especially compact control device.

When the method is used only for a hydrodynamic clutch for controlling the operating material supply from an operating material supply system assigned only to said clutch, the pressure balance is provided at least with the connections to the operating material supply source and the cooling device, with one connection for the supply line and one for the discharge line of the hydrodynamic clutch. In this case, the control plunger of the pressure balance is also actuated by a force formed from a variable characterizing at least indirectly the desired set state of the hydrodynamic clutch and additionally by a counter-acting force formed by the pressure in the discharge line. This always ensures feedback between the desired set state and the actually set state.

BRIEF DESCRIPTION OF THE DRAWINGS

The solution of the invention is explained below by means of the drawings, as follows:

FIGS. 1a–1d show a section of a lubricant or operating material supply system with a control system according to the invention for a hydrodynamic clutch;

FIGS. 2a–2b is a general block diagram of the control of the invention;

FIG. 2c is a block diagram of the control of the invention for a hydrodynamic clutch with its own operating material supply system;

FIGS. 6a–6b illustrate, each by means of a section of a pressure balance with varying configurations of the control plunger, the arrangement of the valve devices required for achieving a permanent lubricant supply;

FIGS. 7a–7b illustrate, each by means of a section of a pressure balance of varying configuration the arrangement of the valve devices integrated in the connecting lines between the reservoir and the pressure balance, or between the reservoir and the lubricant supply line;

FIGS. 9a and 9b illustrate the individual functional positions of the pressure balance for an embodiment in accordance with FIG. 8.

DETAILED DESCRIPTION

Figure 1A:
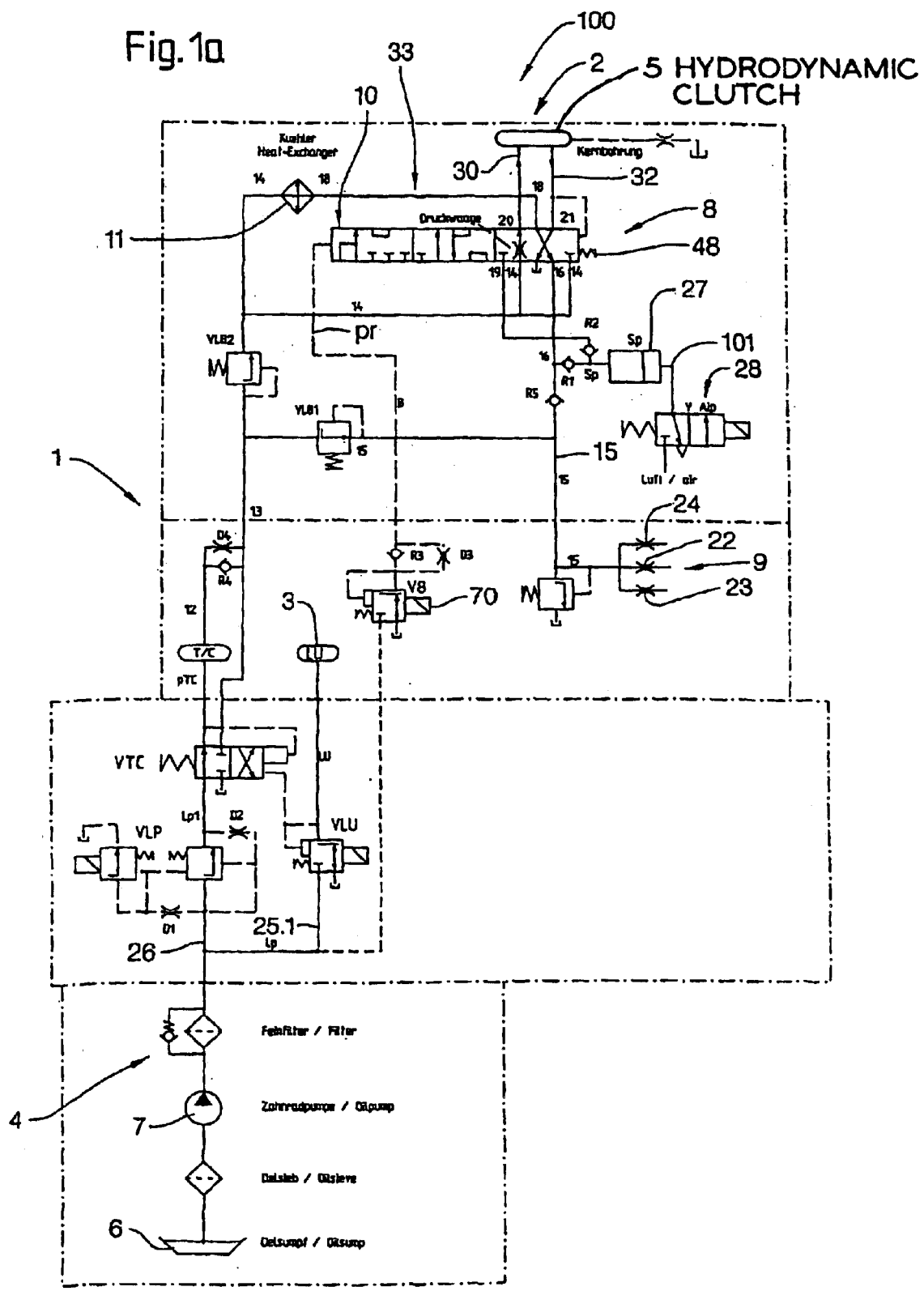

FIGS. 1a to 1d are schematically simplified illustrations by mean of a hydraulics plan of a section of a drive system 1 with a drive unit 100 comprising at least one hydrodynamic element 2, in the present case a hydrodynamic clutch 5, a bridging clutch 3 and a lubricant or operating material supply system 4. The hydrodynamic clutch comprises at least one rotor blade wheel and one stator blade wheel (not shown) which together form a toroidal working space. A guide wheel for changing the transmitting behavior by means of changing the swirl is not provided, i.e. the clutch has no guide wheel. The drive unit with the hydrodynamic clutch 5 can be disposed in front of or inside the transmission. The hydrodynamic clutch 5 is then located on the driving side of the transmission. The lubricant or operating material supply system 4 comprises an operating material source 6, in the present case in the form of an oil sump, from which by means of a pumping device, in the present case a gear pump 7, the oil is supplied to the respective line systems for supplying the individual elements—the hydrodynamic clutch 5 and/or the drive unit 100.

According to the invention, a control device 8 is assigned to the hydrodynamic clutch 5, which, in addition to controlling a variable characterizing at least indirectly the functional state of the hydrodynamic clutch 5, preferably the fill factor, realizes or controls various supply functions of the lubricant system 9 of the complete drive unit 100, for example. The control device 8 for controlling a variable characterizing at least indirectly the functional state of the hydrodynamic clutch 5 is preferably configured as a pressure balance 10.

The functional principle is based on compensating the force of pressure acting on a plunger of known cross-sectional area or on the sealing fluid in a ring pipe by means of a counter-force, where a balance of forces is achieved in that the plunger is moved, for example. To this aim, a set variable for a variable characterizing at least indirectly the functional state of the hydrodynamic clutch can be preset which serves as an input variable of a control device 8 assigned to the associated lubricant or operating material supply system 4 for controlling an adjustment device for influencing the operating material supply of the hydrodynamic clutch 5 and the lubricant supply 9 of the complete drive unit 100. Said set variable for actuating the adjustment device is then generated from the set value of the variable characterizing at least indirectly the functional state of the hydrodynamic clutch in dependence of a variable characterizing at least indirectly the pressure in a discharge line 32 of the hydrodynamic clutch 5.

By means of the pressure balance 10, at least three, preferably four basic functional states of the hydrodynamic clutch 5 can be set, but the adjustment is advantageously continuous. With regard to the design of the pressure balance 10, reference is made to FIGS. 3 and 4.

In a first functional state of the hydrodynamic clutch 5, operating material is supplied from the operating material source 6 via a cooling device 11 into the lubricant system 9 of the drive unit 100. Said functional state is illustrated in FIG. 1a. The operating material, for which oil is used above all, flows from the oil sump 6 via line 13 into the adjoining line section 14, the cooling device 11 and line 18 into the lubrication line 15 which is coupled to the lubricant connections of the lubricant supply system 9 of the drive unit 100. In said functional state, the hydrodynamic clutch 5 is completely empty, and no operating material is supplied to the toroidal working space. The disengaged state of the hydrodynamic clutch 5 corresponds to the first functional state. In said state, no torque is transmitted, and the operating material is required merely for lubricating the individual elements of the drive unit 100. In the lubrication line 15, a back-pressure valve R5 is advantageously disposed so as to prevent the operating material from flowing back from the lubrication line 15.

The lubricant or operating material supply system used by the drive unit 100, i.e. by the hydrodynamic clutch 5 and the bridging clutch 3, also supplies the bridging clutch 3 with the required control pressure. In the illustrated case in FIG. 1a, the supply line 25.1 is coupled directly to the principal supply line 26 that connects the pumping device, in the present case the gear pump 7, with line 13.

A reservoir 27 is assigned to the hydrodynamic clutch 5. The reservoir 27 is preferably air-operated. To this aim, a valve 28 is assigned to the reservoir 27. Said valve is enabled only briefly for purposes of filling the hydrodynamic element, especially the hydrodynamic clutch 5, and then it is disabled.

Figure 1B:
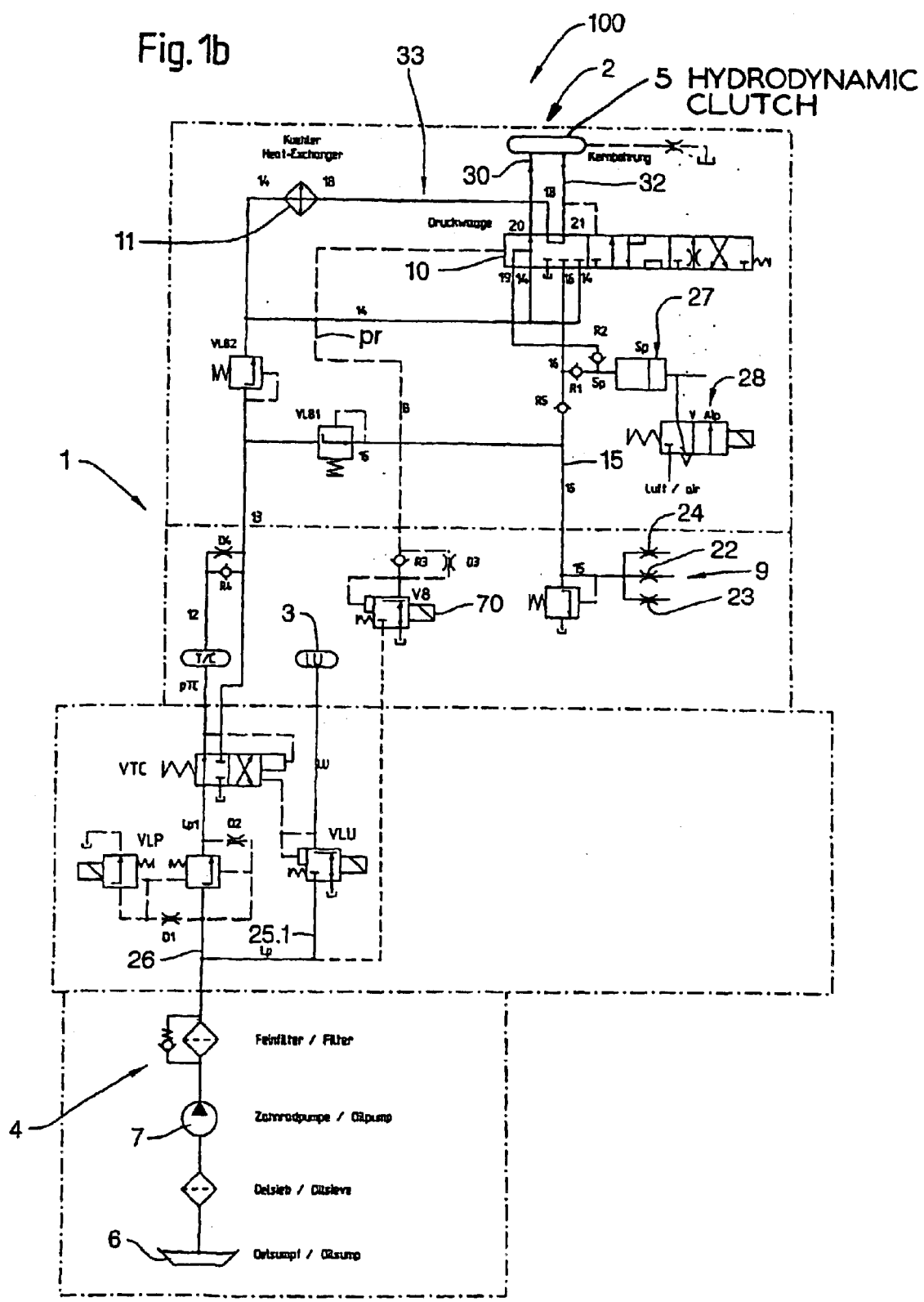

The state of putting the hydrodynamic clutch 5 into operation, the so-called filling phase, can be described by the line connections illustrated or realized by means of the pressure balance 10 in FIG. 1b. The filling process substantially takes place via the reservoir 27 which can be coupled via line 19 with the supply line 30 by means of the pressure balance 10.

A valve device in the form of a back-pressure valve R2 is then preferably provided in line 19 so as to prevent that the operating material will flow back from the hydrodynamic clutch into the reservoir 27 in the event that the filling resistance becomes greater than the available push-in pressure applied by means of the valve device 28. The coupling between the pressure balance and the reservoir is realized via a line 16. Furthermore, line 16 is connected to the lubrication line 15 of the drive unit 100. In order to prevent that the stored volume is pushed out into the lubrication line 15 and thus into the lubricant system of the drive unit 100, a valve device, for example the back-pressure valve R1, is provided in the connecting line between the reservoir and line 16. In addition to the filling via the reservoir 27, operating material is supplied via the operating material source 6. The operating material flows from the principal line 26 into the connecting line 13 to line 14 which is coupled to the cooler. The operating material then flows via line 14, the coupling between line 14 and line 20, which is coupled to the supply line 30 of the hydrodynamic clutch, into the hydrodynamic clutch 5. In addition, operating material is supplied from the reservoir 27 into the connection between line 14 and line 20, which is realized by means of the pressure balance 10, in that line 19 is also coupled to line 20. As a result of the pressure differences arising in the hydrodynamic clutch, operating material enters line 21 via the discharge line 32 and is supplied as a result of the position or positions of the pressure balance 10 characterizing said functional state into the connecting line to the cooler 11 and to line 14 via said cooler so as to be resupplied to the hydrodynamic clutch 5. Therefore, during the filling phase a closed cooling circuit is already formed between the discharge line 32 of the hydrodynamic clutch 5 and the supply line 30. Said closed circuit can also be called cooling circuit and is identified by 33 in the present case. Therefore, the cooling circuit 33 is coupled to line 13 and thus to the supply line from the operating material source 6 to the hydrodynamic clutch, where, as shown in the present case, common lines are advantageously used, in the present case a section of line 14.

The flow of operating material used for cooling, i.e. the cooling circuit 33 which is formed in addition to the working cycle in the working space of the hydrodynamic clutch, is characterized by a change in the direction of the flow of operating material relative to the flow of the operating material or lubricant in the first functional state of the hydrodynamic clutch.

When actuated by means of compressed air the reservoir 27 has a reservoir plunger 101, for example, which is coupled to the valve device 28 and therefore one side of the plunger is actuated by compressed air. On the other side of the reservoir plunger 101, there is operating material which is pushed into the clutch 5. Although a sealing device is provided, operating material may collect on the air-actuated side of the plunger 101 after a certain operating time and result in the risk that such operating material will be discharged into the open via the aeration of the valve 28. In order to prevent this, the leaking oil can be removed by specifically discharging it. The air-actuated side of the plunger then forms an oil chamber that accommodates a certain volume of leakage oil, which can be discharged via a discharge opening in the oil chamber, for example. Another option is the automatic removal of the collected operating material. In this case, a connecting line to the drive unit 100 is assigned to the air channel for actuating the plunger, i.e. the coupling between the reservoir 27 and the valve device 28, where a ball valve device is disposed in the drive unit 100, for example. As soon as the collected operating material exceeds the level of the ball vale, operating material is blown briefly from the air side of the reservoir 27 into the drive unit 100 with every actuation. Said effect is generated in that the valve seat is opened by the ball as a result of gravity when the pneumatic valve 28 is disengaged. When the pneumatic valve 28 is engaged, the valve seat is closed by the sudden flow of air. Between the functional states of the ball valve with open and with closed valve seat, a certain amount of operating material briefly flows from the air-actuated side of the plunger to the side of the drive unit. Said amount of operating material is determined by the length of the path, the obliqueness of the valve seat and the layout of the cross-sections of flow and must safely exceed the maximum amount of leakage so as to ensure that no operating material will exit via the pneumatic valve 28.

A further third functional state of the hydrodynamic clutch 5 can be described by the position of the pressure balance 10 and the connections thus realized between the individual lines, as illustrated in FIG. 1c. Said functional state describes the controlled state of the hydrodynamic clutch 5. Lines 14 and 20 are coupled together and thus to the supply line 30 of the hydrodynamic clutch 5. The pressure in channel 14 approximates the inflow resistance in line 20. The pumping device in the form of the gear pump 7 merely resupplies the amount of leakage of the hydrodynamic clutch. Excess operating material supplied by the pumping device, especially the gear pump 7, flows from line 14 to the line section 16 and from there into the lubricant line 15 to the lubricant connections 22 to 24. The coupling between the supply line 30 of the clutch and the reservoir 27 is disconnected. Because of the pressure differences arising in the clutch 5, a cooling circuit 33 is also generated in this case, where the coolant flows from the discharge line 32 into the connecting line 18 to the cooling device 11 and after passing the cooling device 11, it is supplied to the supply line 14 and into the supply line 30 of the hydrodynamic clutch. If there is any excess operating material, a portion thereof is guided via line 16 into the lubricant system 9 of the drive unit 100. Said third functional state can be divided further into a fourth functional state which is required for setting very low pressures, i.e. for generating a low transmission moment. In said functional state, the supply pressure is lowered below the level of the pressure in line 16.

With regard to the individual positions of the control valve of the pressure balance 10 for realizing the individual functional states, please see FIGS. 4a to 4d which will be described below.

The function of the control device 8 according to FIGS. 1a to 1d is illustrated in the form of a block diagram in FIG. 2a. Accordingly, the control device 8 has at least one input 40 and six outputs 41 to 46. The input 40 can be coupled to a device 47 for presetting a set value for a variable characterizing at least indirectly the functional state of the hydrodynamic clutch. According to the preset value, the control device 8 forms set variables, in the present case the individual set variables Y1 to Y6, for setting the desired functional state. Forming the set variables takes into consideration the aspect under which the operating material or lubricant supply system is not only assigned to the hydrodynamic clutch, it is also responsible for respectively supplying the bridging clutch and the other elements of the drive unit with lubricant or the respective control pressure.

Specifically, this means that the respective couplings between supply, discharge, cooling device, operating material source, lubricant system and reservoir have to be realized in accordance with the formed set variables.

This can take place via a plurality of valve devices, for example, which are disposed accordingly in the commonly used line system. A preferred, especially advantageous embodiment of the control system is illustrated schematically simplified in FIGS. 1a to 1d. The block diagram for said device is found in FIG. 2b. The so-called control pressure $p_r$ serves as the input variable of the control device 8 which is embodied by a pressure balance 10. The control pressure acts on the plunger area of a so-called control plunger which acts as a transfer link 49. Other input variables are the force $F_4$ applied by means of an energy storage unit 48, for example in the form of a spring-type storage device, and the pressure $p_{32}$ prevailing in the discharge line 32 of the hydrodynamic clutch 5. From said input variables, an output variable is produced for the movement of the control plunger 49 and thus the control edges relative to the individual line connections by the path □s. The respective position of the control plunger 49 then determines the functional states of the hydrodynamic clutch as a result of the coupling between individual line sections or lines. The actual constructive embodiment of the pressure balance 10 is described by means of an example in FIG. 3.

Figure 3:
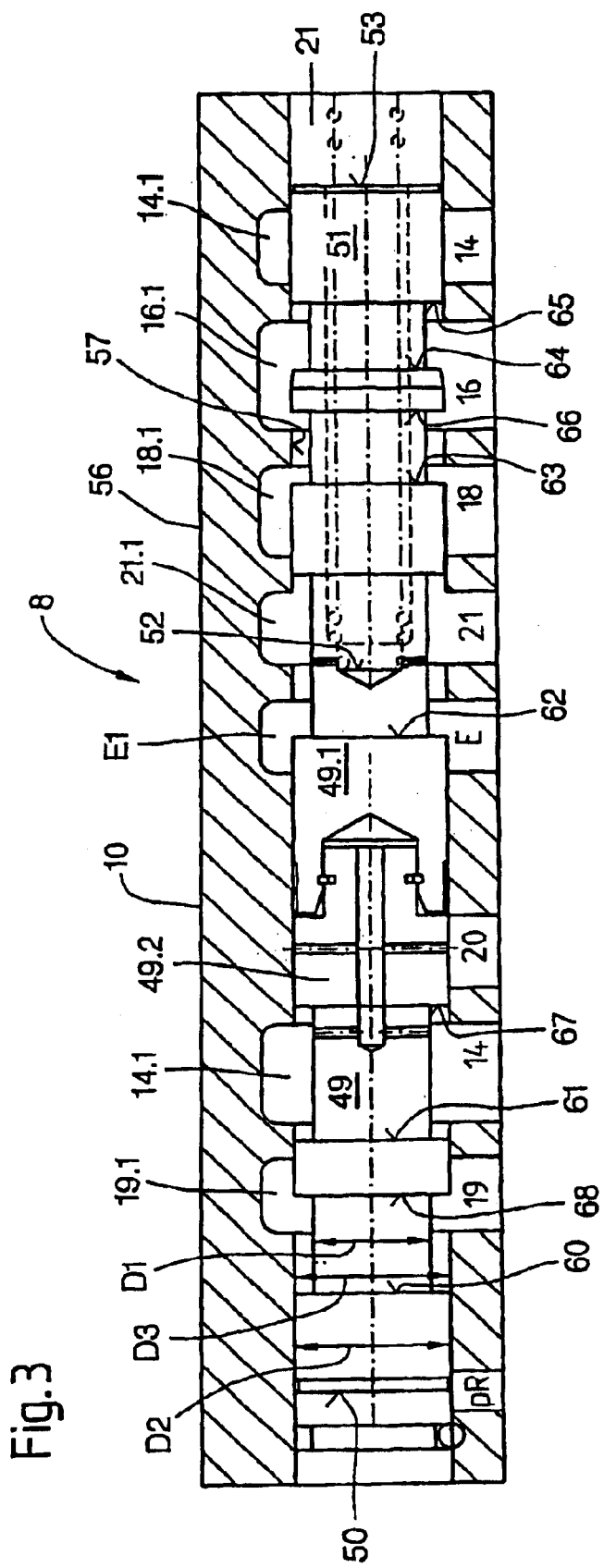
FIG. 3 is an embodiment of a control device configured in accordance with the invention in the form of a pressure balance.

FIG. 3 is a sectional view illustrating an option of the constructive embodiment of the pressure balance 10 used as a control device 8 according to the invention. It comprises a housing 56 in which at least one control boring 57 is provided. Said control boring 57, as viewed over its axial extension, has varying diameters that form individual control chambers identified by 19.1, 14.1, 20e.1, 21.1, 18.1, 16.1 and 14.1 in accordance with the connections. In the control boring 57, a control plunger 49 is disposed which can be moved in an axial direction and which has varying diameters over its axial extension.

Together, the individual partial sections with varying diameter form control edges. In the present case, said control edges are identified by 60, 61, 62, 63, 64, 65, 53, 67 and 68.

The areas of varying outside diameter of the control plunger 49 are alternating. The control plunger is advantageously configured such that, as viewed over its axial length, it merely has two different diameters, a first diameter D1, which is smaller than the diameter D3 of the control boring. The second diameter D2 of the control plunger 49 substantially corresponds to the diameter D3 of the control boring 57 taking into account the respective tolerances required for realizing an axial movement of the control plunger 49 in the control boring 57. Based on the position of the control plunger 49, especially the control edges in the control boring 57, the individual connections are at least partially or fully uncovered or covered, thereby achieving the individual functional states of the hydrodynamic clutch 5 and the function of supplying the lubricant system of the complete drive unit 100. The individual connections are assigned to the respective lines in the lubricant system as follows:

1st connection 14—lubricant supply source 6 and cooling device 11
2nd connection 19—reservoir 27
3rd connection 20—supply line 30 of the hydrodynarnic clutch 5
4th connection 21—discharge line 32 of the hydrodynamic clutch 5
5th connection 18—cooling device 11
6th connection 16—lubricant line 15

The respective identifications of the connections correspond to the line identifications shown in FIG. 1.

Furthermore, another connection is provided for the control pressure pR, which acts upon the area 50 of the control plunger 49. In order to realize the function of the pressure balance, a counter-force is assigned to the force directed at the area 50 by means of the pressure pR, which consists of the force of a spring-type storage device 48 and the force formed in the discharge line 21 to the piston area 53 as a result of the pressure prevailing in the discharge line 32 of the hydrodynamic clutch. The spring-type storage device 48 is disposed in a respective boring 51 in the control plunger 49. The spring is supported by the inside boring surface 52 of the boring 51 in the control plunger 49.

As illustrated in the present case, the control plunger is advantageously configured in two parts comprising a first part 49.1 and a second part 49.2. This is advantageous in that the control boring can be produced more efficiently by approaching it from two sides.

Figure 4A:
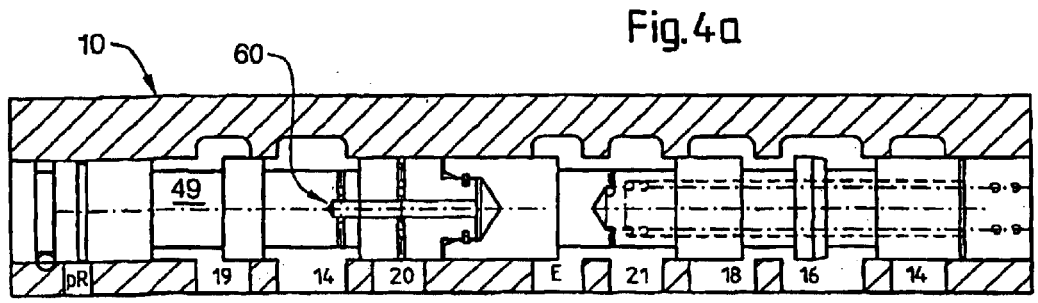
FIG. 4 shows the positions of the control plunger of the pressure balance of FIG. 3 in the functional states of the hydrodynamic clutch described under FIGS. 1a–1d.

For the embodiment of the pressure balance shown in FIG. 3, FIGS. 4a to 4d illustrate the individual functional states, as described for FIGS. 1a to 1d, by means of the positions of the control edges in the control boring 57. FIG. 4a illustrates the first functional state in which the hydrodynamic clutch is not in operation, i.e. it is disengaged. In said state, the discharge line 32 is connected via line 21 and thus the connection 21 with the relief device E. Furthermore, via the connection 16, lubricant or operating material is supplied from the operating material source 6 into the lubricant line 15, which is why connection 18 is in flow connection with connection 16 in said state. Therefore, the flow of operating material is merely guided via the cooling device into the lubricant line 15, as already described under FIG. 1a.

Figure 4B:
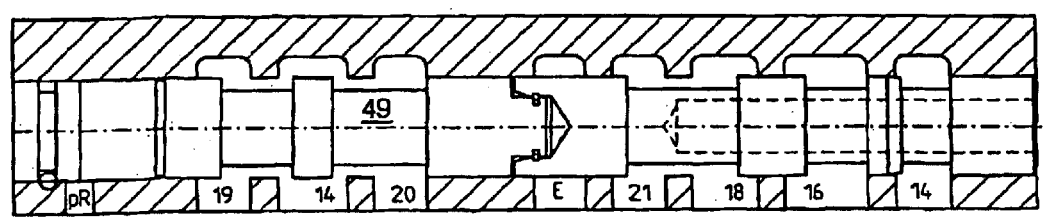

FIG. 4b illustrates the position of the control plunger 49 for the second functional state of the hydrodynamic clutch. Said area is also called the area where the hydrodynamic clutch is put into operation or the filling phase. The filling advantageously takes place via the reservoir 27 and thus via lines or connections 19 and 20 and additionally via line or connection 14 from the operating material source to line 20 which is coupled to the supply line 30. Therefore, as shown in FIG. 4b, the operating material can enter connection 20 from connection 19. According to said functional method, the discharge line 32 of the hydrodynamic clutch 5, which is coupled to connection 21, is in flow connection with connection 18, which is coupled to the cooling device 11. The two connections 16 and 14 which are located outside in an axial direction are locked.

Figure 4C:
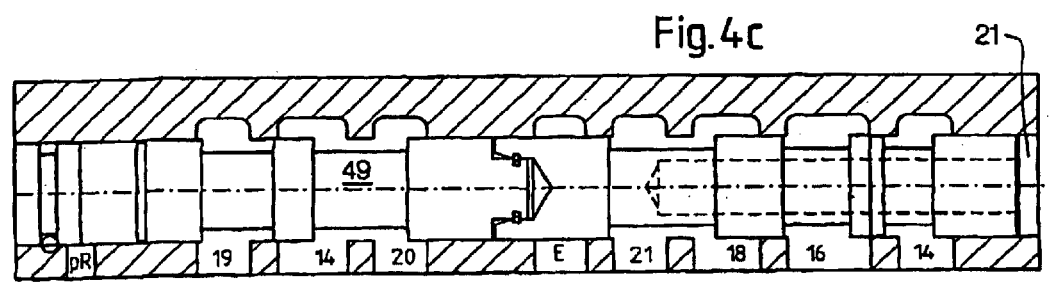

FIG. 4c illustrates the position of the control plunger 49 in the controlled state of the hydrodynamic clutch, where the control plunger with the control edge 64 leaves the lock between the connections 14 and 16. A flow connection exists between connections 14 and 20 and between 21 and 18 so as to realize a cooling circuit, where the working space of the hydrodynamic clutch or the supply line 30 is supplied via the coupling of connections 14 and 20. The coupling to the reservoir, especially the coupling between connections 19 and 14, is disconnected. Therefore, the hydrodynamic clutch 5 is supplied only with the operating material from the reservoir, which is required to achieve a controlled state. The controlled state or the beginning of said controlled state is then characterized by the overlapping of the control edge 64 and the respective control edge in the control boring 57 between connections 16 and 14.

Figure 4D:
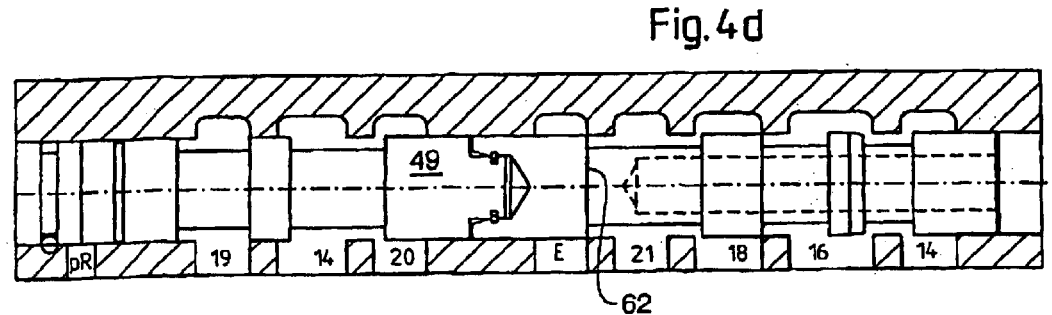

The area of the controlled state can be further limited by the position of the control plunger 49 shown in FIG. 4d. While the filling phase of the hydrodynamic clutch 5 is characterized in that the control plunger 49 moves in an axial direction in the direction of the control pressure pR that acts on the control plunger area 50, the control plunger 49 in the controlled state moves in an axial direction opposite the active direction of the control pressure pR. The two boundary positions describing the area of the controlled state are shown in FIGS. 4c and 4d. The second boundary or controlled position shown in FIG. 4d is characterized in that the control edge 62 of the control plunger 49 assumes the end position in which the relief line is connected to the connecting line 21, and thus to the discharge line 32 of the hydrodynamic clutch 5. Over the complete controlled state, however, the operating material circulates from the discharge line 32 of the hydrodynamic clutch to the cooling device via line 21 to connection 18 and after passing the cooling device again to the supply line 30 of the hydrodynamic clutch via the line or connections 14 and 20. Furthermore, shortly after achieving the controlled state, the supply of operating material to the lubricant line 15 of the drive unit 100 is realized.

The control device 8, especially the pressure balance 10, which is controlled via a control pressure pR, set by means of a proportional valve 70, as shown in FIGS. 1a to 1d, for example, allows that the individual line sections or the individual lines are coupled together so as to bring the hydrodynamic clutch 5 into the respective functional states. Furthermore, means are assigned to the commonly used lubricant or operating material supply system which cooperate with the control device 8 and give priority to performing certain functions in the operating material or lubricant supply system.

In accordance with the function to be performed, said means can vary in design and configuration. In FIGS. 1a to 1d, the valves VLB1 and VLB2 as well as R5 are disposed so as to prevent breakdowns in the lubricating oil supply of the drive unit 100 during the functional state FILLING or the controlled state. The valve device VLB2, which is disposed in the connecting line between the principal connecting line between the oil sump 6 and line 14, is a pressure control valve. The valve device VLB1, disposed in a connecting line between the lubricating oil line and the principal line 13, is a pressure reducing valve. The valve device R5 is a back-pressure valve. When the pressure in the lubricating oil line 15 drops below a certain level, the valve device VLB1, i.e. the pressure reducing valve, connects the principal line 13 and therefore the operating material supply source with the lubricating line 15. The hydrodynamic clutch is then in a bypass with respect to the operating material supply. The functional state achieved by the hydrodynamic clutch is irrelevant. The valve device VLB2 generates a slight pressure back-up so as to allow the necessary flow of lubricating oil from the principal line 13 via VLB1 to the lubricating line 15.

Figure 5:
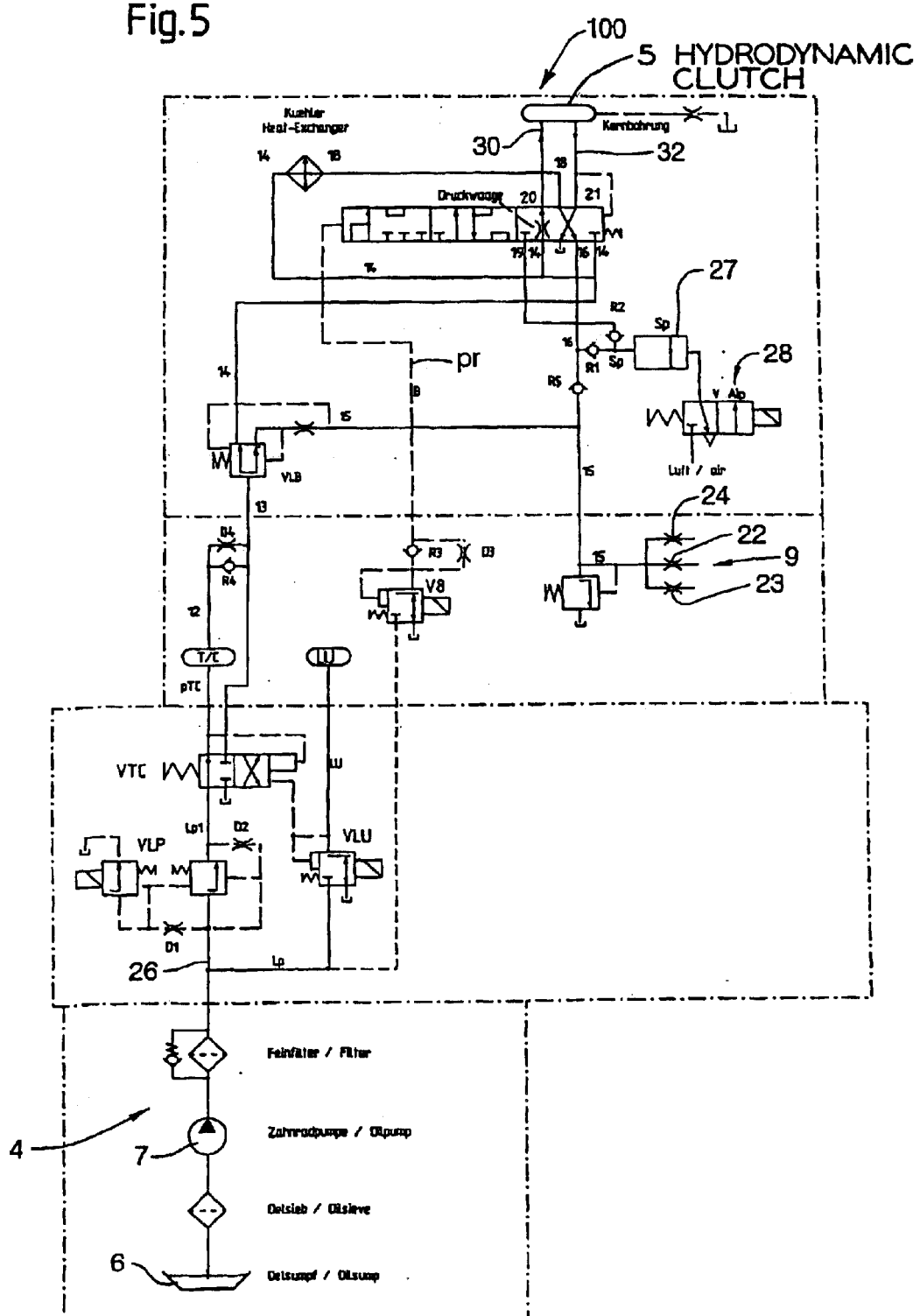
FIG. 5 is an embodiment of a lubricant or operating material supply system with volume control.

While the embodiment according to FIGS. 1a to 1d with the valves VLB1 and VLB2 always ensures a certain pressure in the lubricating system of the drive unit during operation, FIG. 5 illustrates another option of supplying the lubrication system of the drive unit 100 via a volume controller that supplies a certain amount of oil, which can be set via a throttle or a spring, into the lubrication system 15 regardless of the prevailing pressure conditions. The valve devices VLB1 and VLB2 are then replaced by the valve device VLB.

Figure 1D:
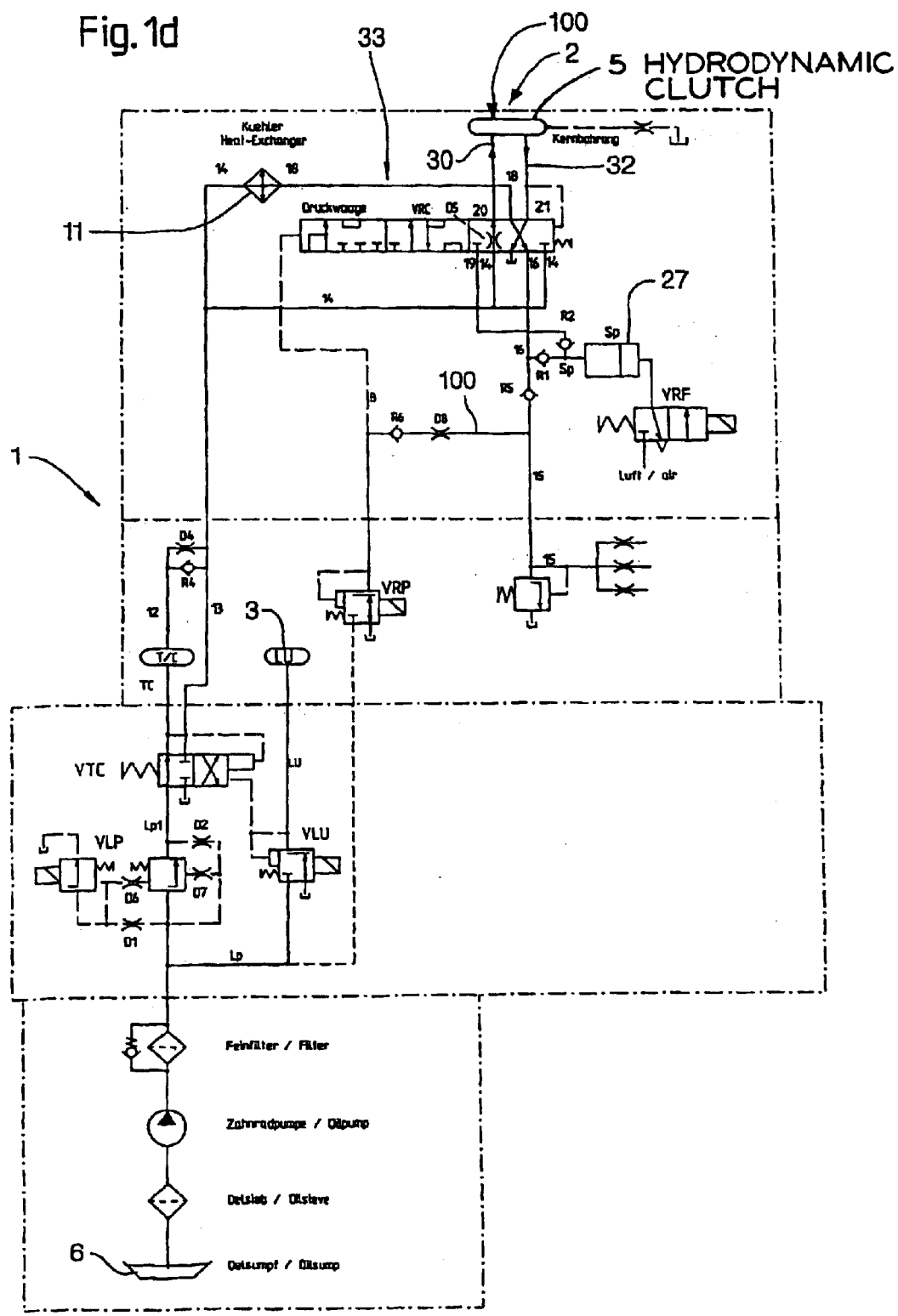

Another alternative for the structural configuration of the operating material or lubricant supply system 4 ensuring the lubrication of the drive unit 100 while being filled is illustrated in FIG. 1d. The basic design of the overall system consisting of the hydrodynamic clutch 5, the drive unit 100 and the bridging clutch 3, but not including the valve devices VLB1 and VLB2, corresponds to the one described under FIGS. 1a–1d. Therefore, the same identifications are used for identical elements. A minimal lubricant supply which can be set by means of a throttle D8, or alternatively by means of a spring, is then ensured in the lubricant supply system 15 regardless of the existing pressures. Furthermore, in order to realize said function, a back-pressure valve R6 is provided. The throttle D8 and the back-pressure valve R6 are disposed in a connecting line 100 between the lubricant supply line 15 and the connecting line 8 from the proportional valve 70 for presetting a set value or generating a set value signal in the form of a pressure for a desired functional state of the hydrodynamic clutch with the control device 8, especially the pressure balance 10. Said arrangement is advantageous in that the device is only active in operation, and therefore, no cooling oil is lost while driving. Furthermore, it is possible to make the configuration described in FIG. 1d highly cost-effective.

The pressure control of the hydrodynamic clutch is configured such that in operation, the drive unit is lubricated directly from the sump 6, because that is where the coldest operating material is available. The operating material flows from the operating material source 6 to the control where a small amount is branched off for compensating leakages, while the main portion of the lubrication 15 flows into the drive unit.

The control device, especially the pressure balance, and the valve devices that are coupled to or integrated with the pressure balance in a unit, can vary with regard to the chambers formed in the control boring, the control edges of the control plunger and the assignment of the connections. However, it is relevant that the four basic functional states of the control of the hydrodynamic clutch are achieved, where at least in the controlled state a stepwise and advantageously a continuous transition is achieved between the individual basic functional states.

FIGS. 6 and 7 illustrate by means of a section of the pressure balance 10 the options of arranging individual valve devices, such as VLB1 and VLB2 and the volume controller VLB in the control boring 57. While FIG. 6a reflects the arrangement of the valve devices VLB1 and VLB2 in the control boring 57 by means of a section of the pressure balance 10, FIG. 6b shows an embodiment of the control plunger 49, which is comprised of two parts, in addition to the arrangement of the volume controller VLB in the control boring 57.

In contrast, FIG. 7a shows the arrangement of the back-pressure valves R1, R2 and R5 in the control plunger 49 for an embodiment according to FIG. 6a, and FIG. 7b shows the arrangement for an embodiment of the control plunger 49 according to FIG. 6b. Said arrangement is such that the back-pressure valve devices can influence the cross-sections of the lines as shown under FIG. 1, i.e. they are assigned to the respective lines.

Figure 8:
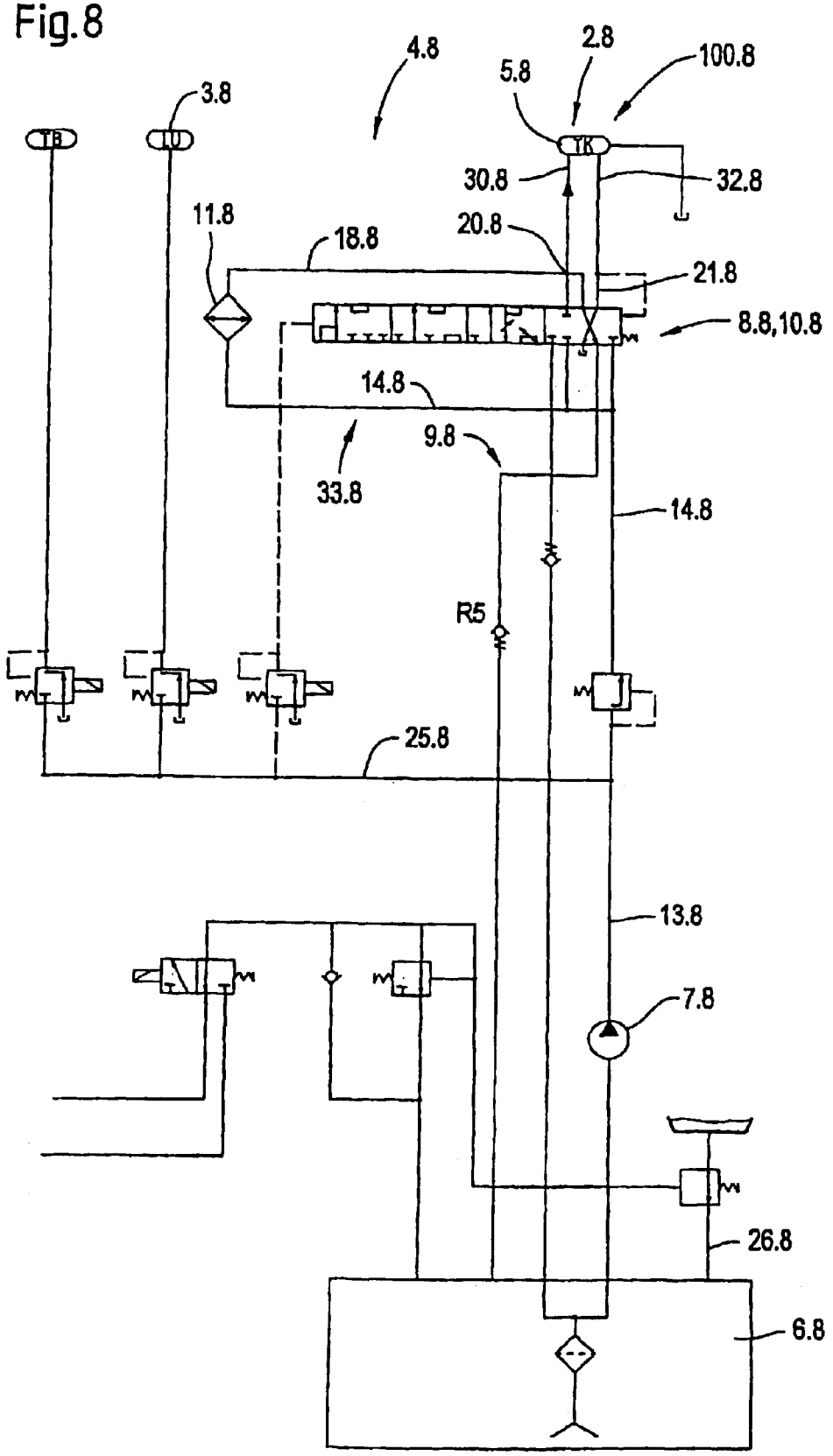
FIG. 8 illustrates, by means of a control diagram according to FIG. 1a a simplified lubricant or operating material supply system with the inventive control of a hydrodynamic clutch.

FIG. 8 illustrates a simplified lubricant or operating material supply system 4.8 by means of an illustration according to FIG. 1a for a drive unit 100.8. The fundamental principle of supplying the hydrodynamic element 2.8 in the form of the hydrodynamic clutch 5.8 corresponds to that described in FIG. 1. Therefore, the same identifications are used for identical elements. The lubricant or operating material supply system 4.8 comprises an operating material source 6.8, in the present case in the form of an oil sump, in the present case a sealable oil sump from which by means of a pumping device, in the present case the gear pump 7.8, the oil is to the respective line systems for supplying the individual elements—the hydrodynamic clutch 5.8 and/or the drive unit 100.

According to the invention, a control device 8.8 is assigned to the hydrodynamic clutch 5.8 which, in addition to controlling a variable characterizing at least indirectly the functional state of the hydrodynamic clutch 5.8, advantageously the fill factor, realizes or controls various supply functions, for example controlling or supplying the bridging clutch and supplying the complete drive unit 100 with lubricant. The control device 8.8 for controlling a variable characterizing at least indirectly the functional state of the hydrodynamic clutch 5.8 is embodied by a pressure balance 10.8. The functional principle is based on compensating the force of pressure acting on a plunger of a known cross-sectional area or the sealing liquid in a ring pipe by means of a counter-force where a balance of forces is achieved by moving the plunger, for example. A set variable can be preset for a variable characterizing at least indirectly the functional state of the hydrodynamic clutch, which serves as input variable of a control device 8.8 assigned to the associated lubricant or operating material supply system 4.8 for controlling an adjustment device for influencing the operating material supply of the hydrodynamic clutch 5.8 and the lubricant supply of the complete drive unit 100. The set variable for actuating the adjustment device is then generated from the set value of the variable characterizing at least indirectly the functional state of the hydrodynamic clutch in dependence of a variable characterizing at least indirectly the pressure in a discharge line 32.8 of the hydrodynamic clutch 5.8.

Via the pressure balance 10.8, at least three, advantageously four basic functional states of the hydrodynamic clutch 5.8 can be set, but advantageously the adjustment is continuous. Please see FIGS. 3 and 4 for the construction of the pressure balance 10.8.

In a first functional state of the hydrodynamic clutch 5.8, operating material is supplied from the operating material source 6.8 via a cooling device 11.8 into the lubricant system 9.8. Said functional state is illustrated in FIG. 9a by means of a section of the hydraulics drawing according to FIG. 8. The operating material, for which oil is used above all, flows from the oil sump 6.8 via line 13.8 into the adjoining line section 14.8, the cooling device 11.8 and line 18.8 into the lubricant line 15.8 which is coupled to the lubricant connections of the lubricant supply system 9.8 of the drive unit 100.8. In said functional state the hydrodynamic clutch 5.8 is completely empty, and no operating material is supplied to the toroidal working space. The disengaged state of the hydrodynamic clutch 5.8 corresponds to the first functional state. In said state, no torque is transmitted, and the operating material is required merely for lubricating the individual elements of the drive unit 100.8. In the lubricant line 15.8, a back-pressure valve R5 is advantageously disposed so as to prevent that the operating material flows back from the lubricant line 15.8.

The lubricant and operating material supply system 4.8 commonly used by the drive unit 100.8, i.e. by the hydrodynamic clutch 5.8 and the bridging clutch 3.8, also supplies the bridging clutch 3.8 with the required control pressure. In the illustrated case, under FIG. 1a, the supply line 25.8 is coupled directly to the principal supply line 26.8 that connects the pumping device, in the present case, the gear pump 7.7, with line 13.8.

The state of putting the hydrodynamic clutch 5.8 into operation, the so-called filling phase, can be described by the line connections for the operating position 1 illustrated or realized in FIG. 9a by means of the pressure balance 10.8.

The filling process substantially takes place via the oil sump 6.8 which can be coupled via a line 14.8 to the supply line 30.8 by means of the pressure balance 10.8. The line 14.8 is advantageously provided with a pressure control valve VLP.

The operating material flows via the principal line 26.8 into the connecting line 13.8 to line 14.8. The operating material then flows via line 14.8, the coupling between line 14.8 and line 20.8, which is coupled to the supply line 30.8 of the hydrodynamic clutch, into the hydrodynamic clutch 5.8. As a result of the pressure differences arising in the hydrodynamic clutch 5.8 operating material enters line 21.8 via the discharge line 32.8 and is supplied as a result of the position or positions of the pressure balance 10.8 characterizing said functional state into the connecting line to the cooler 11.8 and via said cooler back into line 14.8 so as to be resupplied to the hydrodynamic clutch 2. Therefore, during the filling phase a closed cooling circuit is already formed between the discharge line 32.8 of the hydrodynamic clutch 5.8 and the supply line 30.8. Said closed circuit can also be called cooling circuit and is identified by 33.8.

A further third functional state of the hydrodynamic clutch 5.8 can be described by the position of the pressure balance 10.8 and the connections thus realized between the individual lines as illustrated in FIG. 9c. Said functional state describes the controlled state of the hydrodynamic clutch 5.8. The lines 14.8 and 20.8 are coupled together and thus to the supply line 30.8 of the hydrodynamic clutch 5.8. The pressure in the channel 14.8 approximates the inflow resistance in line 20.8. The pumping device in the form of the gear pump 7.8 merely resupplies the leakage amount of the hydrodynamic clutch. Excess operating material supplied by the pumping device, especially the gear pump 7.8, flows from line 14.8 into the lubricant line 15.8 or back into the sealable sump 6.8. Because of the pressure differences arising in the clutch 5.8, a cooling circuit 33.8 is also generated in this case, where the coolant flows from the discharge line 32.8 into the connecting line 18.8 to the cooling device 11.8 and after passing the cooling device 11.8 it is supplied to the supply line 14.8 and into the supply line 30.8 of the hydrodynamic clutch. Any excess operating material is returned to the sump 6.8 via line 19.8. Said third functional state, which corresponds to the operating position 2 in FIG. 8, can be further divided into a fourth functional state which is required for setting very low pressures, i.e. for generating a low transmission moment, which corresponds to the operating position 3 of the pressure balance 10.8 and which is illustrated in FIG. 9d. In said functional state, the supply pressure is lowered.

With regard to the individual positions of the control valve of the pressure balance 10 for realizing the individual functional states, please see FIGS. 4a to 4d.

What is claimed is:

1. A method for controlling the filling process of a hydrodynamic clutch (2) from an associated lubricant or operating material supply system (4), comprising at least one operating material source (6), a cooling device (11), where the hydrodynamic clutch comprises at least two blade wheels that together form a toroidal working space, to which at least one supply line (30) and one discharge line (32) are assigned; the method comprising: presetting a set variable for a variable characterizing at least indirectly the functional state of the hydrodynamic clutch (2), which serves as an input variable of a control device (8) assigned to the associated lubricant and operating material supply system (4) comprising a pressure balance that controls an adjustment device for influencing the operating material supply of the hydrodynamic clutch (2) such that at least three basic functional states of he hydrodynamic clutch (2) can be set, where the set variable for actuating the adjustment device is generated from the set value of the variable characterizing at least indirectly the functional state of the hydrodynamic clutch (2) in dependence of a variable characterizing at least indirectly the pressure in the discharge line (32) of the hydrodynamic clutch (2), and in a first functional state, the hydrodynamic clutch (2) is empty, in a second basic functional state of the hydrodynamic clutch (2) supplying the working space of the hydrodynamic clutch (2) with operating material from the operating material source (6), and in a closed circuit, resupplying operating material from the working space to the working space via the cooling device (11).

2. Method as defined in claim 1, where the lubricant or operating material supply system (4) further comprises a reservoir (27) characterize in that in the second and third basic functional states the working space of the hydrodynamic clutch (2) is additionally supplied with operating material from the reservoir (27).

3. Method as defined in claim 1, characterized in that at least in the third basic functional state the change in the pressure in the discharge line (32) to the working space can be set so as to be continuous.

4. Method as defined in claim 1, characterized in that the transition between the individual functional states can be set so as to be continuous.

5. Method as defined in claim 1, characterized by the following features:
the hydrodynamic clutch being a component of a drive unit with a bridging clutch (3) and a common lubricant or operating material supply system (4) is assigned to the hydrodynamic clutch (2) and the bridging clutch (3);
where in a basic functional state of the hydrodynamic clutch a supply of the lubricant system for the drive unit can be additionally set;
where in the first functional state of the hydrodynamic clutch operating material from the operating material source(6) is supplied to the lubricant connection (15) of the drive unit via the cooling device (11).

6. Method as defined in claim 5, characterized in that the supply of the hydrodynamic clutch (2) with operating material takes priority over the supply of the complete drive unit with lubricant.

7. The combination comprising:
a control device for influencing the functional state of a hydrodynamic clutch (2) with an associated lubricant and operating material supply system (4), comprising at least one operating material source (6), a cooling device (11), the hydrodynamic clutch (2) comprising at least two blade wheels that together form a toroidal working space and one supply line (30) and one discharge line (32);
the control device (8) with at least one input for a variable characterizing at least indirectly a set functional state and a plurality of outputs;
the outputs being coupled to means for influencing the supply line (30) and/or the discharge line (32) of the hydrodynamic clutch;
means for influencing the supply from an operating material source (6) and/or for realizing an operating material circulation in a closed circuit from the hydrodynamic clutch (2);
the control device (8) comprising a pressure balance (10);
the pressure balance (10) being provided with at least one control boring (57);
the control boring (57) connected at least indirectly at least to the following connections:
supply (30) of the hydrodynamic clutch (2)
discharge (32) of the hydrodynamic clutch (2)
operating material supply source (6)
the pressure balance (10) further provided with at least one control plunger (49) guided in the control boring (57) while at least partially releasing and/or locking the coupling with the connections, where the control plunger (49) can be actuated by a force of pressure which is at least proportional to the variable characterizing at least indirectly the set functional state and a counter-force characterized by the pressure in the discharge line (32) of the hydrodynamic clutch (2), where a balance of forces is achieved by means of moving the control plunger (49).

8. The combination as defined in claim 7, characterized in that the control boring (57) is connected to connections for the lines (18, 14) of a closed hydrodynamic circuit (33) assigned to the working space of the hydrodynamic clutch (2).

9. The combination as defined in claim 7, wherein:
the outputs are formed by the connections (20, 19, 14, 16);
the means for influencing the supply and/or discharge (30, 32) of the hydrodynamic clutch (2) are formed by the pressure balance (10).

10. The combination as defined in claim 7, characterized in that the input of the pressure balance (10) for a variable characterizing at least indirectly the functional state of the hydrodynamic clutch (2) is formed by a hydraulic connection for forming a force of pressure on a plunger area of the control plunger (57).

11. The combination as defined in claim 10, characterized in that input of the pressure balance (10) is coupled to a proportional valve (70) serving as a device for presetting a set functional state.

12. The combination as defined in claim 7, characterized in that for presetting the set functional state the control plunger (49) can be actuated by means of an electromagnetically generated force.

13. The combination as defined in claim 7, characterized in that for presetting the set functional state the control plunger (49) can be actuated by means of a mechanically generated force.

14. The combination as defined in claim 7, characterized in that the control plunger (49) comprises at least two partial elements (49.1, 49.2) which can be firmly connected.

15. The combination as defined in claim 7, characterized by the following features:
the hydrodynamic clutch (2) is a component of a drive unit comprising a bridging clutch;
the lubricant and operating material supply system (4) assigned to the hydrodynamic clutch (2) is also assigned to the bridging clutch;
the outputs of the control device (8) are coupled to means for influencing the lines (15) of the lubricant supply system (9) of the drive unit (100).

16. The combination as defined in claim 7, characterized in that the control boring (57) is coupled to a lubricant supply line (15).

17. The combination as defined in claim 16, characterized in that for realizing a continuous lubricant supply at least on volume control valve (VLB) is provided between the connections of the lubricant supply line (15) and the supply (30) to the hydrodynamic clutch (2) in the control boring (57).

18. The combination as defined in claim 16, characterized in that for realizing a continuous lubricant supply at least two valve devices (VLB1, VLB2) that are actuated in dependence of the pressure are provide in the control boring (57) where via a first valve device (VLB1) the coupling between the operating material supply source (6) and the supply (30) of the hydrodynamic clutch 2) is produced and via a second said valve device (VLB2) the coupling between the operating material supply source (6) and the lubricant supply system (9) of the drive unit is produced.

19. The combination as defined in claim 18, characterized in that the two valve devices (VLB1, VLB2) for realizing a continuous lubricant supply which are actuated in dependence of the pressure and/or the back-pressure valve devices (R1, R5) that are disposed in the control boring (57) and the valve device (R2) are combined into one valve unit.

20. The combination as defined in claim 7 for a drive system with a storage device (27), wherein:

the pressure balance is provided with a connection (19) which is connected to a storage device and which can be coupled to the supply (30) of the hydrodynamic clutch (2) by means of moving the control plunger (57);

a valve device (R2) is assigned to storage device connection (19) for preventing a back flow of the operating material from the hydrodynamic element.

21. Control The combination as defined in claim 20, wherein:

the storage device (27) is connected to the lubricant supply line (15) by a connecting line means and the connecting line means are provided for preventing that the stored volume is pushed out into the lubricant supply line (15);

said means for preventing comprise two back-pressure valve devices (R1, R5).

22. The combination as defined in claim 21, characterized in that the valve device (R2) and the back-pressure valve devices (R1, R5) are disposed in the control boring (57) of the pressure balance (10).

* * * * *

UNITED STATES PATENT AND TRADEMARK OFFICE
CERTIFICATE OF CORRECTION

PATENT NO. : 6,951,101 B2
DATED : October 4, 2005
INVENTOR(S) : Nitsche et al.

It is certified that error appears in the above-identified patent and that said Letters Patent is hereby corrected as shown below:

Column 15,
Line 1, delete "he" and insert -- the --.
Line 16, delete "characterize" and insert -- characterized --.

Column 17,
Line 5, insert -- ( -- before "2)".

Column 18,
Line 4, delete "Control".

Signed and Sealed this

Twenty-eighth Day of February, 2006

JON W. DUDAS
*Director of the United States Patent and Trademark Office*